(12) United States Patent
Bhat (10) Patent No.: US 10,496,944 B2
(45) Date of Patent: Dec. 3, 2019

(54) POINT OF ENTRY ON USER INTERFACE

(71) Applicant: SAP SE, Walldorf (DE)

(72) Inventor: Raveeshkumar Bhat, Bangalore (IN)

(73) Assignee: SAP SE, Walldorf (DE)

( * ) Notice: Subject to any disclaimer, the term of this patent is extended or adjusted under 35 U.S.C. 154(b) by 691 days.

(21) Appl. No.: 14/252,782

(22) Filed: Apr. 15, 2014

(65) Prior Publication Data

US 2015/0294253 A1    Oct. 15, 2015

(51) Int. Cl.
*G06Q 10/06* (2012.01)
*G06F 3/0484* (2013.01)
*G06F 3/0482* (2013.01)

(52) U.S. Cl.
CPC ..... *G06Q 10/06316* (2013.01); *G06F 3/0482* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 7,653,873 | B2* | 1/2010 | Brandt | G06F 8/34 705/2 |
| 8,806,361 | B1* | 8/2014 | Noel | G06F 3/0484 715/771 |
| 8,930,262 | B1* | 1/2015 | Searson | G06Q 40/02 705/38 |
| 2004/0036716 | A1* | 2/2004 | Jordahl | G06F 17/30601 715/713 |
| 2004/0196310 | A1* | 10/2004 | Aamodt | G06F 3/0482 715/738 |
| 2005/0120352 | A1* | 6/2005 | Subramaniam | G06F 17/30557 719/310 |
| 2010/0010953 | A1* | 1/2010 | Meliksetian | G06Q 10/06 706/47 |

(Continued)

OTHER PUBLICATIONS

Yu Lei, Wang Whili, Meng Luoming, and Qiu Xuesong. Clustering and Recommendation for Semantic Web Service in a time Series. College of Computer Science, Innter Mongolia University, Hohhot, China. State Key Laboratory of Networking and Switching Technology, Beijing University. (Year: 2014).*

(Continued)

*Primary Examiner* — Stephanie Z Delich
(74) *Attorney, Agent, or Firm* — Buckley, Maschoff & Talwalkar LLC (57) ABSTRACT

Customizable swim-lanes are provided on a user interface (UI) to gain a single point of entry into a multitude of work-items associated with a corresponding business process. To generate the single point of entry, parameters associated with the work-items are analyzed and rendered on the UI. Based upon a selection of one or more parameters, UI elements are generated to execute functionalities associated with the work-items. The generated UI elements and the associated work-items are orchestrated into a plurality of clusters based on the selected parameters. A single point of entry is provided by generating a plurality of customizable swim-lanes and rendering the plurality of customizable swim-lanes on the UI. The customizable swim-lanes provide the single point of entry to the plurality of UI elements to execute functionalities associated with the plurality of work-items.

18 Claims, 8 Drawing Sheets

(56) References Cited

U.S. PATENT DOCUMENTS

2013/0086479 A1* 4/2013 Brown ............... G06F 21/6218
715/741

OTHER PUBLICATIONS

Ling-Yin, Wei, Wen-Chih Peng. An Incremental algorithm for clustering spatial data streams: exploring temporal locality. Knowl Info Syst (2013) 37: 453-483, Springer-Verlag London. (Year: 2013).*

Andrienko, Natalia, Andrienko, Gennady. A visual analytics framework for spatio-temporal analysis and modeling. Data Min Knowl Disc (2013) 27:55-83. (Year: 2012).*

* cited by examiner

| TYPE OF ACTIVITY | WORK ITEMS ASSOCIATED WITH ACTIVITY PLANNING FOR A QUALITY CONTROL MANAGER | IDENTIFIER |
|---|---|---|
| MARKETING | SEND PURCHASE ORDER TO CLIENT ABC; HIGH PRIORITY TASK TO BE COMPLETED BY 12TH JANUARY 2015 | 1A |
| MARKETING | MEETING WITH BEN FROM ORGANIZATION ZYX; HIGH PRIORITY MEETING SCHEDULED FOR 20TH MARCH 2015 | 1B |
| MARKETING | ASSIGN TASKS TO TEAM MEMBERS; TASK TO BE COMPLETED BY AUGUST 2015 | 1C |
| MARKETING | SET GOALS FOR TEAM MEMBERS FOR CALENDAR YEAR 2015 TASK TO BE COMPLETED BY 31ST JANUARY 2015 | ... |
| MANAGER | PLAN INTERIM WORK PROGRESS REVIEW MEETING WITH TEAM TASK TO BE COMPLETED BY JUNE 30TH 2015 | ... |
| MANAGER | UPDATE WEEKLY WORK ACTIVITY REPORT; HIGH PRIORITY TASK TO BE COMPLETED BY FRIDAY EVERY WEEK; REPEAT WEEKLY | ... |
| MANAGER | UPDATE MONTHLY WORK ACTIVITY REPORT; MEDIUM PRIORITY TASK TO BE COMPLETED BY 28TH OF EVERY MONTH; REPEAT MONTHLY | 2C |
| COORDINATOR | GENERATE QUARTER-YEARLY REPORTS TASK TO BE COMPLETED ON THE FIRST DAY OF EVERY QUARTER | ... |
| COORDINATOR | COORDINATE WITH TRAINING DEPARTMENT TASK TO BE COMPLETED BY 3RD FEBRUARY 2015 | 3A |
| COORDINATOR | MEETING WITH TOM FROM ORGANIZATION ABC; LOW PRIORITY MEETING SCHEDULED FOR 25TH MARCH 2015 | 3B |

| SELECTED PARAMETERS 505 | UI ELEMENTS + FUNCTIONALITIES 510 |
|---|---|
| PRIORITY | ☆ ○ ⇨ — 515, 520, 525 |
| TIMELINE | DUE TODAY<br>DUE THIS WEEK<br>DUE THIS MONTH<br>DUE THIS QUARTER<br>DUE THIS YEAR |
| ROLE SPECIFICS | MANAGERIAL ROLE<br>MARKETING ROLE<br>COORDINATOR ROLE<br>DECISION MAKER ROLE |

POINT OF ENTRY ON USER INTERFACE

BACKGROUND

Resource management and capital management tools assist in maintaining a stock of competencies that contribute to the growth of an organization and produce working-capital or economic value. To accomplish the tasks involved in resource and/or capital management, transactions and collaborations between software applications and programs associated with management tools are employed. Typically, numerous user interfaces to interact with such applications are provided to accomplish the underlying transactions and collaborations, which may become cumbersome over time.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to generate a point of entry on a user interface (UI) are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Rendering a point of entry or an entry point for a program may provide access to business data, transactions and collaborations involved in executing an associated business process-on a single interface. In an embodiment, tasks or work-items associated with the business process may be orchestrated to provide a single point of entry or access to the work-items. Orchestrating the work-items includes orchestrating UI elements that represent the work-items on the UI. The work-items may be clustered such that the work-items of same cluster are similar. The clustered work-items may also be presented based on parameters associated with them, such that the work-items having a common parameter and/or a common attribute of the parameter may be grouped and rendered on the interface. In an embodiment, the attribute may represent a measure of the parameter. For example, if a parameter is TIMELINE, the attribute associated with the parameter may include "START DATE" and "END DATE", and the corresponding values include "START ON FIRST DAY OF WEEK" and "DUE THIS WEEK" respectively, where the start-date of an associated work-item is start of a current week, and end-date/completion of the associated work-item is end of the current week.

Figure 1:
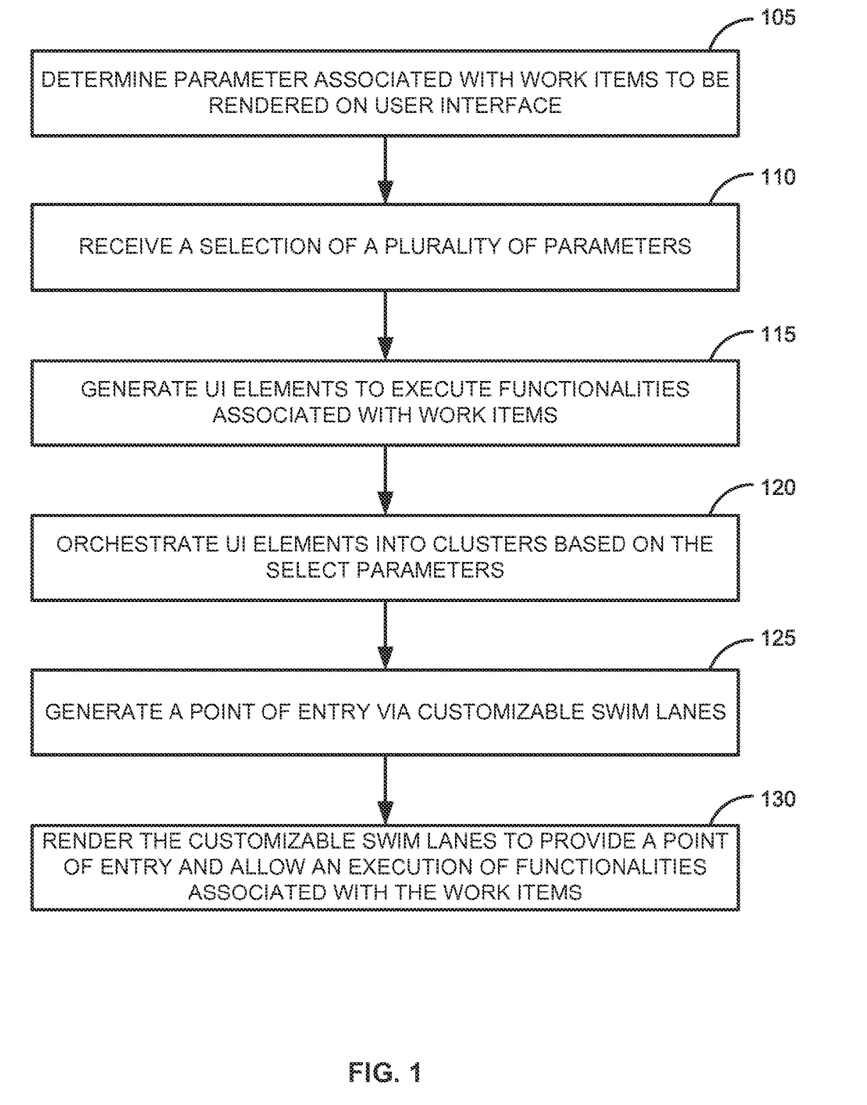
FIG. 1 is a block diagram illustrating a process to generate a point of entry on a user interface, according to an embodiment.

FIG. 1 is a block diagram illustrating a process to generate a single point of entry on a user interface, according to an embodiment. For a set of work-items to be rendered on a user interface (UI), associated parameters are determined at 105. The work-items may include parameters based on which the work-items are executed. For example, consider two work-items: first work-item "SEND PURCHASE ORDER TO CLIENT" and second work-item "SEND A TENDER TO CLIENT"; including parameter "TIMELINE" with a value of its attribute (e.g. DATE OF COMPLETION) as "IMMEDIATELY"; parameter "PRIORITY" with a value of its attribute (e.g. URGENCY FOR COMPLETION) as "HIGH": and parameter "ORGANIZATION" with a value of its attribute (e.g. NAME OF ORGANIZATION) as "ABC". Here, the parameters may provide information for the execution of the work-item. For example, the parameters-value pairs "TIMELINE=IMMEDIATELY"", "PRIORITY=HIGH", and "ORGANIZATION=ABC" provide complete information to execute the work-item "SEND PURCHASE ORDER TO CLIENT", "IMMEDIATELY" to "ORGANIZATION ABC" at "HIGH" priority.

Consider, for example, fifteen such work-items with various parameters (single or multiple) associated with them to execute a business process XYZ as shown in Table 1.

TABLE 1

| List of work-items associated with business process XYZ | | |
| --- | --- | --- |
| WORK-ITEM 1<br>PRIORITY = MEDIUM<br>TIMELINE = 1st Jan. 2015 | WORK-ITEM 6<br>TEAM = PAA | WORK-ITEM 11<br>PRIORITY = MEDIUM |
| WORK-ITEM 2<br>TIMELINE = 1st Mar. 2015 | WORK-ITEM 7<br>PRIORITY =<br>LOW | WORK-ITEM 12<br>SENDER = TIM |
| WORK-ITEM 3<br>TIMELINE = 1st Nov. 2015 | WORK-ITEM 8<br>PRIORITY =<br>LOW | WORK-ITEM 13<br>SENDER = TIM |
| WORK-ITEM 4<br>TIMELINE = 15th Oct. 2015 | WORK-ITEM 9<br>TEAM = MNO | WORK-ITEM 14<br>SENDER = JOHN |
| WORK-ITEM 5<br>TIMELINE = 15th Jan. 2015 | WORK-ITEM 10<br>PRIORITY =<br>HIGH | WORK-ITEM 15<br>SENDER = MIKE |

At 110, a selection of a number of parameters from the determined parameters is received. Based upon the selected parameters, UI elements are generated at 115 to execute functionalities associated with the work-items. In an embodiment, generating a UI element for a corresponding work-item includes associating functionalities with UI controls that will be rendered on the such that triggering UI control would execute the underlying functionality of the work-item. For example, consider that parameter PRIORITY is selected; based upon the selected parameter "PRIORITY", a UI element is generated to execute the functionality of sending a tender to a client according to first work-item "SEND PURCHASE ORDER TO CLIENT". In an example, the UI element may be a send button that triggers an execution of the work-items having a parameter of PRIORITY set to a corresponding attribute-value High. In another example, the UI element may be a hyperlink to a sub-program that is executed upon the activation of the hyperlink (e.g. by clicking the hyperlink). Thus, UI elements represent the work-items on the UI.

At 120, the UI elements generated are orchestrated into clusters based upon the selected parameters. The generated UI elements are clustered by grouping the corresponding work-items based upon the selected parameters. The work-items of one cluster or one group include at least one common parameter associated with them. Orchestration of the UI elements includes organizing the work-items of one group according to corresponding attributes and values associated with the selected parameter.

For example, consider selected parameter TIMELINE applied to Table 1, to determine the work-items including the parameter TIMELINE. Accordingly, five work-items ITEM 1, ITEM 2, ITEM 3, ITEM 4 and ITEM 5 including the parameter TIMELINE are determined, and UI elements are generated to execute functionalities associated with the five work-items. The parameter-value pair for the five work-items may be as shown in Table 2.

TABLE 2

| Parameter-value pair | |
|---|---|
| Work-item with parameter TIMELINE | Corresponding Value |
| ITEM 1 | $1^{st}$ Jan. 2015 |
| ITEM 2 | $1^{st}$ Mar. 2015 |
| ITEM 3 | $1^{st}$ Nov. 2015 |
| ITEM 4 | $15^{th}$ Oct. 2015 |
| ITEM 5 | $15^{th}$ Jan. 2015 |

Based upon the attribute and the corresponding value of parameter TIMELINE (e.g. the end-dates) for the work-items, the orchestration of the UI elements corresponding to the work-items within CLUSTER 1 may be as shown in Table 3.

TABLE 3

| CLUSTER 1 | |
|---|---|
| Orchestrated work-item with Parameter TIMELINE | Parameter-Value pair |
| ITEM 1 | $1^{st}$ Jan. 2015 |
| ITEM 5 | $15^{th}$ Jan. 2015 |
| ITEM 2 | $1^{st}$ Mar. 2015 |
| ITEM 4 | $15^{th}$ Oct. 2015 |
| ITEM 3 | $1^{st}$ Nov. 2015 |

Based upon the above arrangement of the work-items, UI elements are orchestrated into clusters. At 125, a single point of entry via customizable swim-lanes is generated. Customizable swim-lanes may be described as visual representations of the clusters that are generated based upon the orchestration. The customizable swim-lanes may be generated by placing the clusters adjacent to one another, visually representing swimming lanes in a pool. The adjacent customizable swim-lanes may be arranged horizontally or vertically on a user interface. A swim-lane represents a cluster of UI elements that are orchestrated based upon the selected parameters. By rendering the clusters as customizable swim-lanes, a single point of entry may be provided for the functionalities of the work-items associated with the business process. At 130, the customized swim-lanes are rendered on the UI, to provide a single point of entry for execution of functionalities associated with the work-items. In an embodiment, customizable swim-lanes are customizable based upon various roles of a user, various scenarios, or responsibilities associated with a machine or a user who executes the associated work-items. For example, a sales representative may customize the swim-lanes to view sales reports and/or revenue generation of a previous year on the single point of entry. A legal representative may customize the swim-lanes to view timelines allotted by a legal authority on the single point of entry; a human resource administrator may customize the swim-lanes to view staffing, recruitments, attrition; etc. on the single point of entry. The customizable swim-lanes are customized by considering parameters, attributes and values corresponding to the roles, scenarios and responsibilities to provide a single point of entry into associated tasks and/or work-items; making the work-items executable on a corresponding landing page.

Figure 2:
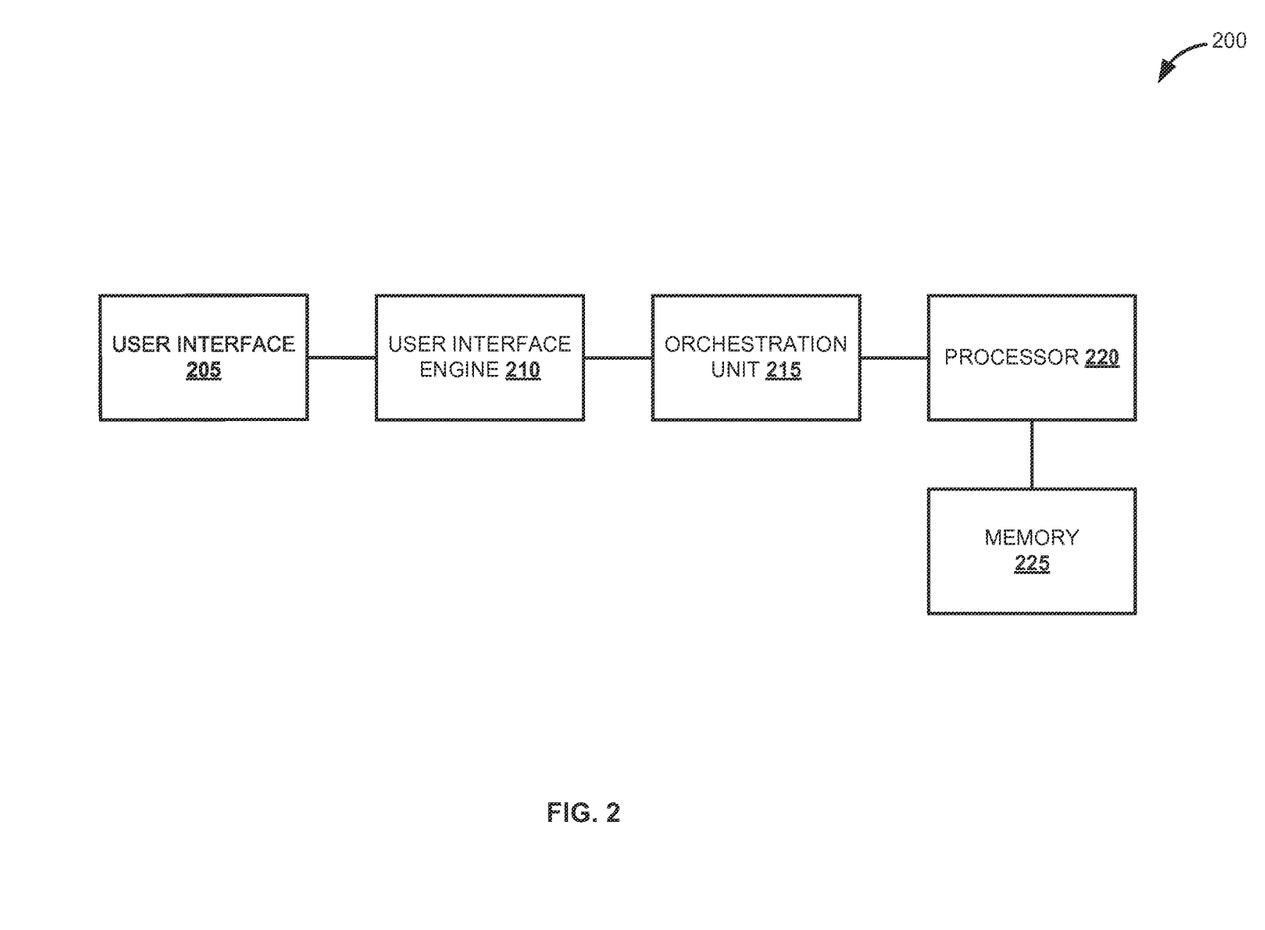
FIG. 2 is a block diagram illustrating a system to generate a point of entry on a user interface, according to an embodiment.

FIG. 2 is a block diagram illustrating a system to generate a single point of entry on a user interface, according to an embodiment. System 200 includes user interface 205, user interface engine 210, orchestration unit 215, processor 220 and memory 225. In an embodiment, the above components are communicatively coupled with one another. User interface (UI) 205 provides a medium of interaction between programs and devices associated with it. UI 205 may be configured to send and receive data, display data and other visualizations. UI 205 provides access to underlying programs and devices through various entry points or interfaces. In an embodiment, UI 205 is configured to render a single point of entry to underlying business data, transactions and collaborations involved in executing an associated business process-on one interface. In an embodiment, tasks or work-items associated with the business process may be arranged to render a single point of entry or access to the work-items, on UI 205. UI engine 210 may be configured to generate such a single point of entry or access to the work-items.

For a concerned business process, UI engine 210 determines parameters associated with work-items that are to be rendered on UI 205. UI engine 210 may render the determined parameters on UI 205, to receive a selection of parameters. The selection of the rendered parameters may be performed to communicate a preference of parameters for sorting the work-items and viewing them on UI 1205. In an embodiment, if a selection of the parameters is not received on UI 205, UI engine 210 may consider the parameters as selected. In another embodiment, UI engine 210 may determine work-items and associated parameters for processing.

Upon receiving a selection of the parameters, UI engine 210 may determine the corresponding work-items of the selected parameters, and classify the work-items based upon associated functionalities. UI engine 210 may also determine tasks to be accomplished by the determined work-items, to execute the associate functionalities. For example, if a selected parameter is TIMELINE, UI engine 210 determines the work-items ITEM 1, ITEM 2, ITEM 3, ITEM 4, and ITEM 5 of table 1 that are associated with parameter TIMELINE. UI engine 210 may classify the items based upon the underlying functionalities. For example, consider ITEM 1 and ITEM 3 are associated with calculating daily wages of the employees of factory ABC; ITEM 2 and ITEM 5 are associated with meeting the sales-manager of two client-companies X and Y; ITEM 4 is associated with assigning tasks to employees of factory ABC. Based upon the parameter TIMELINE and the associated functionalities, the items may be classified into three different groups. UI engine 210 may determine the tasks to be accomplished, for e.g. to meet the sales-manager of two client-companies X and Y, the tasks to be accomplished may include: contacting the sales-managers X and Y, determining their availability based upon severity of the meeting, determining a mutually suitable venue, preparing an agenda for the meeting, sending rout-maps and agenda to the attendees, and the like.

Based upon the selected parameters (and the determined functionalities and tasks), UI engine 210 generates UI elements to execute functionalities associated with the work-items. Generating UI elements includes determining underlying functionalities, sub-programs, dependent programs, associated data sources to extract data, and other information associated with a work-item. Upon determining the information, UI engine 210 generates appropriate UI elements for the work-items. For example, consider a WORK-ITEM 1 that has an underlying task of extracting data from data source 'A', transforming the extracted data to conform to operational needs corresponding to WORK-ITEM 1, and loading the transformed data into a data warehouse 'B'. Here, the underlying tasks associated with WORK-ITEM 1 is determined as extracting data, transforming data and loading data; data source 'A' is determined; data warehouse 'B' is determined; programs, algorithms, and code associated with the transformation is determined; and other information for UI engine 210 to execute the functionalities associated with WORK-ITEM 1 is determined. Upon determining the information, UI engine 210 generates UI elements to carry out the tasks and functionalities associated with WORK-ITEM 1. UI elements may carry out the associated tasks upon a trigger; upon activating or enabling the UI elements; by receiving a user input on the UI elements; by receiving a trigger from UI engine 210, or the like. In an embodiment, generating the UI elements may include generating operational elements to carry out the tasks and consolidating the operational elements to generate the UI elements. For e.g. operational elements including contact sales-manager, determine availability, determine venue, prepare agenda etc. may be generated to perform the underlying task. Upon generating the operational elements, corresponding operational elements are consolidated to generate the UI elements.

Orchestration unit 215 determines hierarchies of occurrences of the UI elements, dependencies associated with UI elements, and transactions and/or collaborations associated with the UI elements. Based upon the determination, orchestration unit 215 categorizes the UI elements and ranks the categorized UI elements based upon the selected parameters. Orchestration unit 215 generates clusters for categorized and ranked UI elements based upon the selected parameters, and orchestrates the clusters to generate customizable swim-lanes. To generate the clusters, orchestration unit 215 determines the parameters associated with the ranked UI elements, and clusters the UI elements having identical parameters. These clusters are organized and orchestrated to generate the customizable swim-lanes. The customizable swim-lanes provide a single point of entry to the underlying work-items, via the UI elements. Processor 220 includes instructions to read and execute instructions related to the generation of the single point of entry via the customizable swim-lanes. Memory 225 stores the instructions related therein. UI engine 210 renders the customizable swim-lanes on UI 205, thereby providing a single point of entry into the work-items via the UI elements for executing the functionalities associated with the work-items.

UI 205 thus renders a landing page as the single point of entry to execute the functionalities associated with the work-items. In an embodiment, rendering the landing page includes rendering several customizable swim-lane views. The customizable swim-lane views may be described as result sets of a query performed on the UI elements, the selected parameters, or the work-items. The customizable swim-lane views may be configured to be queried just as a query performed on a database collection of objects. The customizable swim-lane views may represent a subset of the data contained in memory 225 or the data associated with the concerned business process. The customizable swim-lane views may limit the degree of exposure of the underlying work-items and/or their associated UI elements, by rendering only the UI elements associated with the work-items based upon selected parameters. The customizable swim-lane views may be associated with authentications or permissions based upon roles of users accessing the information rendered therein. The customizable swim-lane views may also be configured to show or hide complexities associated with the work-items, for example the hierarchies, the inter-connections, the dependencies etc. The customizable swim-lane views are configured to render according to the selected parameters, the work-items that are ranked and orchestrated such that the work-items associated with the selected parameters are rendered as a condensed representation.

In an embodiment, rendering the landing page includes rendering a number of expanded views of a customizable swim-lane and/or a cluster. These expanded views include comprehensive representations of contents of the customizable swim-lanes. For example, consider CLUSTER 1 of table 3, where the work-items are rendered in a condensed manner, representing only the title of the work-item and the date on which the work-item has to be completed. This may represent the customizable swim-lane views. To view comprehensive information about the work-items, controls may be provided to be triggered or enabled. Upon enabling these controls, a comprehensive or the expanded view of the customizable swim-lanes may be rendered on UI 205. For example, consider CLUSTER 1 of table 3 representing details of ITEM 1, ITEM 5, ITEM 2, ITEM 4 and ITEM 3, including a performer of the work-items, a data source to perform the work-items, a supervisor of the performer to approve the work-items, a count of the number of days of work to complete the work-items, and so on. These details may be orchestrated by orchestration unit 215, and rendered as expanded view of the customizable swim-lane.

In an embodiment, a resolution strategy may be provided for a role specific entity, via the customizable swim-lanes, thereby providing a single point of entry into various roles, scenarios, or responsibilities to execute associated work-items. For example, a human resource administrator performs work-items related to administration and support of employees in areas assigned to him. His primary tasks may include maintaining employee and organizational data, advising employees and line manager on human resource topics, responding to inquires related to employee data and human resource policies. Thus, the administrator does various types of tasks, collaborates with various departments/teams of the organization, attends discussions, forums, meetings, and undergoes various trainings to be able to handle these various tasks. These tasks may include different UIs, transactions, and collaborations in human capital management systems. The administrator may have to monitor conversations and discussions, to be able to execute the associated tasks. The customizable swim-lanes provide a single point of entry to the human resource administrator to perform the above tasks/work-items. In an embodiment, the administrator may configure a customizable swim-lanes application according to the execution of the work-items in his docket. The customizable swim-lanes may provide multiple functionalities on one landing page, to carry out the executions related to the human resource administrator's docket. The functionalities include: allowing a search/query to be executed on an associated database, to search for a concerned work-item or content thereof; allowing execution of tasks that the administrator holds in his docket; allowing subsequent actions to be performed on the work-items; providing analytics of the underlying data; rendering processes that are to be executed according to his docket; rendering discussions, collaborations and transactions that the administrator has had with various entities; rendering organizational information, policies, guidelines, business codes etc. that are used by the administrator to execute associated work-items; providing quick views (basic information) of the underlying work-items; providing action controls to perform action from the landing page; providing navigation controls to navigate to different sections of the work-items, different work-items, and/or different sections of collaborated entities. These features and functionalities are rendered on the landing page that provides a single point of entry into the associated business process via the customizable swim-lane views.

Figure 3:
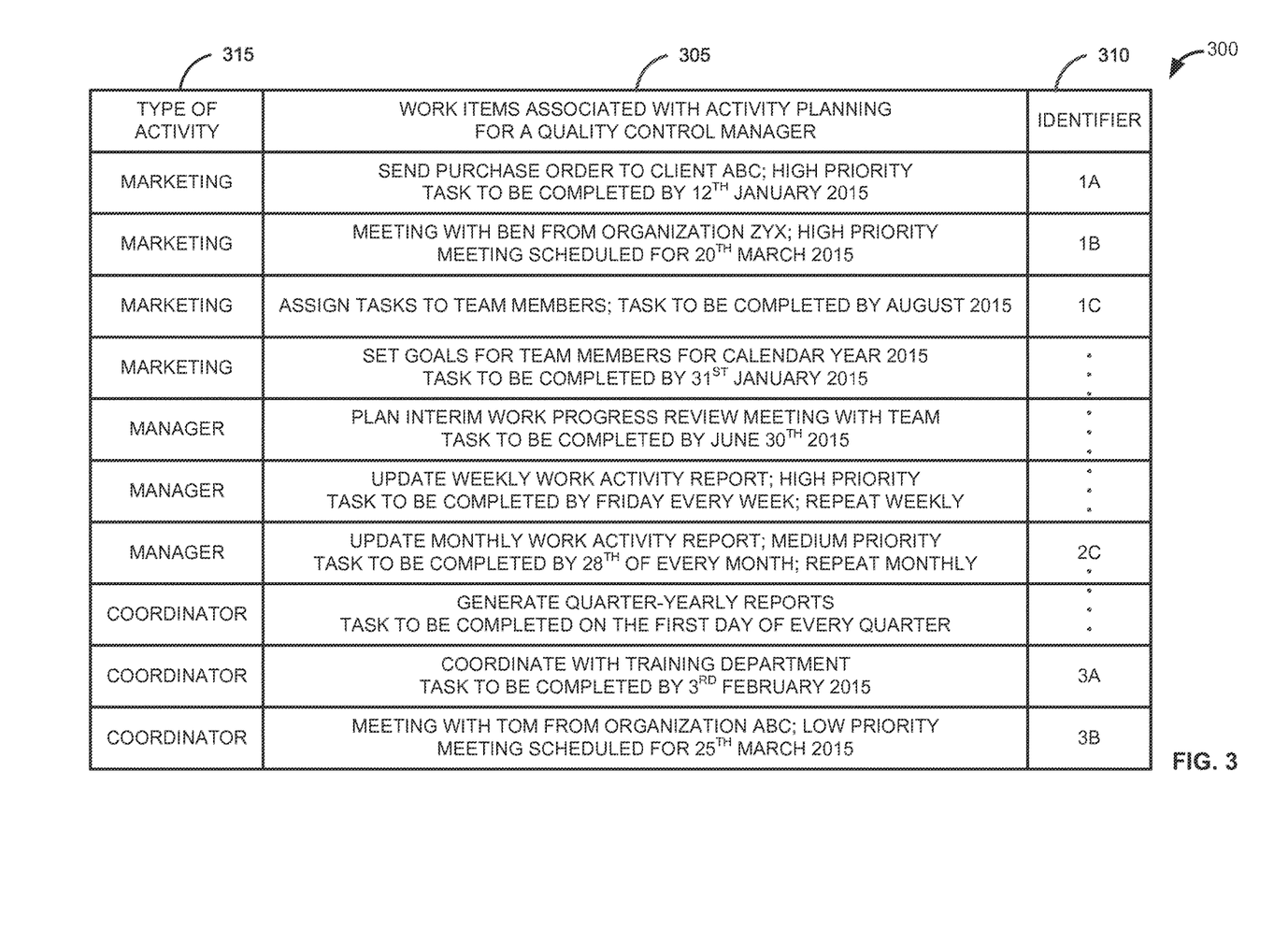
FIGS. 3-5 are graphical representations of user interfaces utilized to generate a point of entry, according to an embodiment.
Figure 4:
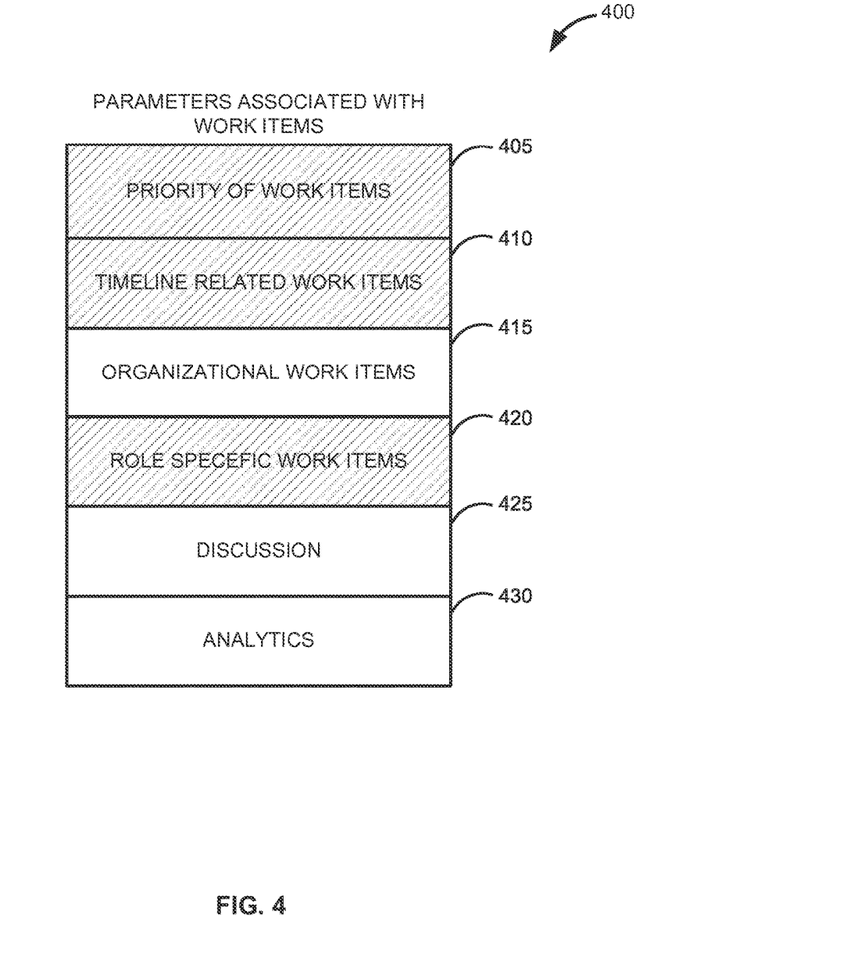
Figure 5:
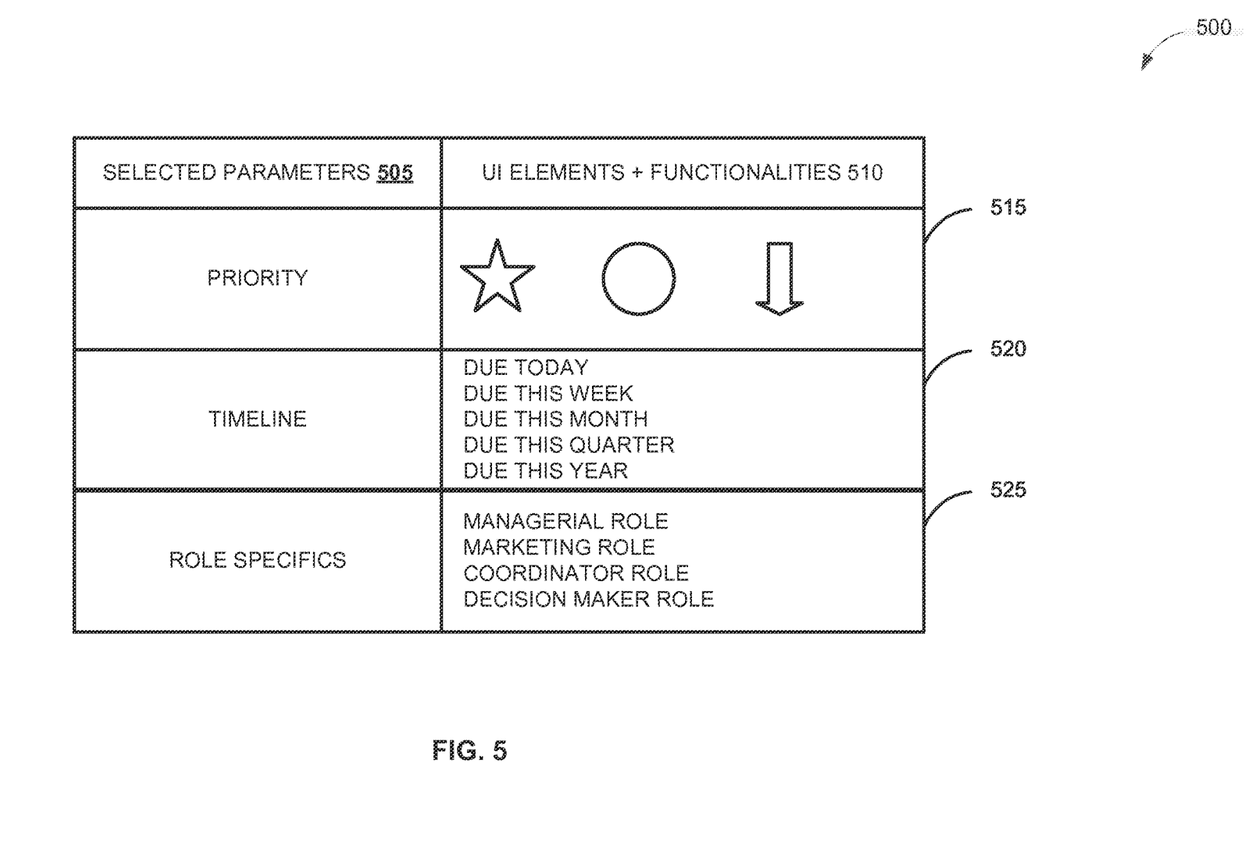

FIGS. 3-5 are graphical representations of user interfaces utilized to generate a single point of entry, according to an embodiment.

FIG. 3 is a graphical representation of a list of work-items for a concerned business process: ACTIVITY PLANNING for a QUALITY CONTROL MANAGER role. Table 300 includes a list of work-items associated with a business process ACTIVITY PLANNING for a role of a QUALITY CONTROL MANAGER. Column 305 represents the list of work-items associated with the ACTIVITY PLANNING for the QUALITY CONTROL MANAGER. A QUALITY CONTROL MANAGER may be executing multiple responsibilities and activities associated therein. For example, the QUALITY CONTROL MANAGER may be performing marketing activity for a product he is supposed to market, managerial activity for a team he heads, and coordinator's activity for a project he heads. He may have various independent, dependent, or interdependent tasks associated with his responsibilities. By providing a single point of entry for the tasks, the QUALITY CONTROL MANAGER can view the tasks on one landing page; where he can make business decisions of the tasks he would want to execute. Column 315 represents the multiple types of activities associated with the multiple responsibilities and column 310 represents identifiers for the work-items. In an embodiment, the work-items listed in 315 may not be sorted in any order.

Upon triggering an orchestration of the work-items associated with business process ACTIVITY PLANNING for a role of QUALITY CONTROL MANAGER, a UI engine determines the parameters associated with the work-items listed in column 305. The parameters that are associated with the work-items may be rendered on a UI, to receive a selection of parameters. FIG. 4 is a graphical representation of the determined parameters rendered on the UI. Upon examining the work-items listed in column 305, the UI engine determines the parameters, generates a list of parameters and renders the list on the UI. For example, table 400 represents a list of six parameters (e.g. 405, 410, 415, 420, 425 and 430) determined from the work-items listed in 305.

Upon rendering the list of parameters associated with work-items (e.g. 400), the UI may receive a selection of three parameters 405, 410 and 420 to orchestrate the work-items. Based upon the received selection, UI elements associated with the work-items are generated as shown in FIG. 5. Element 500 is a graphical representation of the UI elements generated o execute functionalities associated with the work-items. Selected parameters PRIORITY, TIMELINE and ROLE SPECIFICS are represented by column 505. Corresponding UI elements along with their functionalities are represented by column 510. For example, parameter PRIORITY includes UI elements 'HIGH' marked by a star symbol, 'MEDIUM' marked by a circle symbol, and 'LOW' marked by a downward arrow, represented by row 515. Parameter TIMELINE, representing the due date or the end date of associated work-items, includes UI elements 'DUE TODAY', 'DUE THIS WEEK', 'DUE THIS MONTH', 'DUE THIS QUARTER' and 'DUE THIS YEAR', represented by row 520. Parameter ROLE SPECIFICS includes UI elements 'MANAGER ROLE', 'MARKETING ROLE', 'COORDINATOR ROLE' and 'DECISION MAKER ROLE', represented by row 525.

In an embodiment, the UI elements are configured with the corresponding functionalities associated with the work-items such that, upon activating the UI elements, the corresponding functionalities are executed. For example, by clicking on the UI element for HIGH PRIORITY (star) in row 515, work-items that have a high priority are queried and rendered on the UI, along with their corresponding functionalities. The QUALITY CONTROL MANAGER may execute one or more of the work-items that have a high priority, that are rendered on the UI.

In an embodiment, generating the UI elements includes generating operational elements to carry out the tasks to be accomplished by the corresponding work-items. These operational elements may be consolidated to generate the UI elements for executing the functionalities associated with the work-items. For example, UI elements and operational elements may include a total number of work-items associated with a corresponding selected parameter, work-items that can be executed from a landing page where the UI elements are being rendered, content associated with the work-items that are utilized while execution, action buttons that executes the work-items directly from the single entry point UI, action buttons that initiations subsequent actions, configurable processes involved while executing work-items, discussions involving the work-items, potential collaborations with various roles, users, business processes and the like, organizational information that may influence the execution of the work-items, navigation options to navigate between work-items, between parameters, between UI elements and various entities in the hierarchy of their occurrences. Operational elements may save contextual information that can be retrieved for processing at a subsequent instance. Operational elements may render analytics of content/data associated with the work-items. For example, analysis of headcount, analysis of any business logics to be considered for executing the work-items, analytics involving annual results that influence the work-items, analytics rendering static and dynamic content, and the like, to plan QUALITY CONTROL MANAGER'S activities. Operational elements may provide a search or a query ability to determine work-items by accepting search terms or queries and querying an associated database accordingly. UI elements and operations elements are configurable to render work-items that are marked as concerned or interested by a user/machine.

Figure 6:
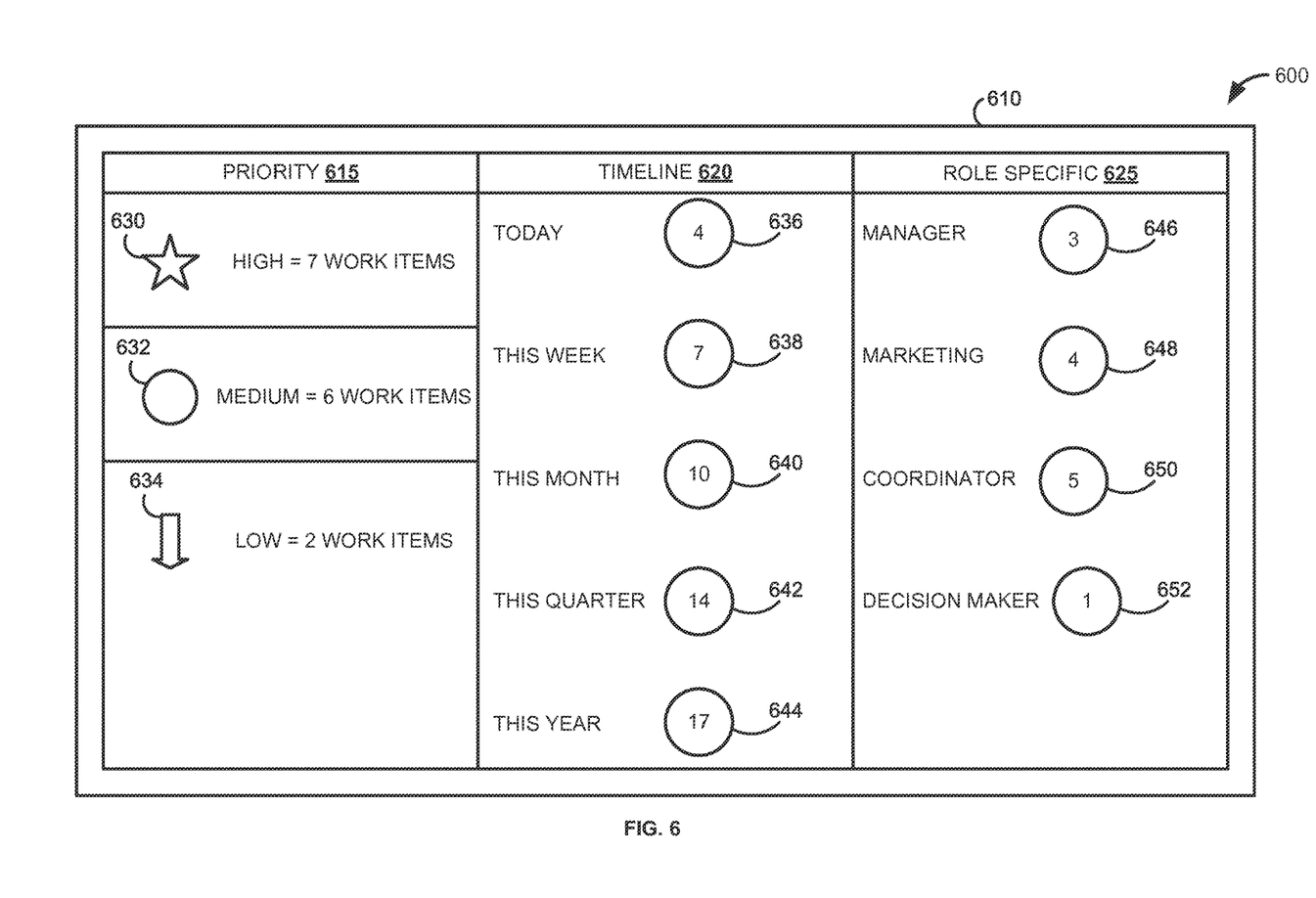
FIG. 6 is a user interface representing customizable swim-lanes that provide a point of entry, according to an embodiment.

FIG. 6 is a user interface representing customizable swim-lanes that provide a single point of entry, according to an embodiment. UI 600 represents the orchestrated UI elements along with the functionalities. For example, column 615 represents the parameter PRIORITY with UI elements 630, 632, and 634. UI elements 630, 632 and 634 are associated with the corresponding functionalities. For example, UI element 630 represents the attribute-value HIGH for the parameter PRIORITY; and the functionalities indicated include 7 WORK-ITEMS, indicating that there are seven work-items that are of HIGH PRIORITY. Similarly, UI element 632 represents the attribute-value MEDIUM for the parameter PRIORITY, indicating that there are 6 WORK-ITEMS with MEDIUM PRIORITY. UI element 634 represents the attribute-value LOW for the parameter PRIORITY, indicating that there are 2 WORK-ITEMS with LOW PRIORITY.

Similarly, column 620 indicates parameter TIMELINE, with UI elements 636, 638, 640, 642, and 644 indicate various timelines TODAY, THIS WEEK, THIS MONTH, THIS QUARTER and THIS YEAR, to complete the associated work-items; and the functionalities indicating the number of work-items to be completed during the respective timelines. Column 625 indicates parameter ROLE SPECIFIC 625, with UI elements 646, 648, 650 and 652 indicating work-items specific to various roles MARKETING, MANAGER, COORDINATOR, and DECISION MAKER; and the functionalities indicating the number of work-items in the respective roles. Thus, the work-items listed in FIG. 3 are clustered, orchestrated and rendered as customizable swim-lanes that provide a single point of entry to execute the work-items.

UI 600 may be rendered as a landing page, to provide the single point of entry to various work-items that are clustered and orchestrated based upon the parameters and the elements. The landing page may include customizable swim-lane views 610, where condensed representation of the single point of entry including the UI elements is rendered. The landing page may also include expanded views of the customizable swim-lanes, where comprehensive representations of contents associated with the customizable swim-lanes are rendered.

Figure 7:
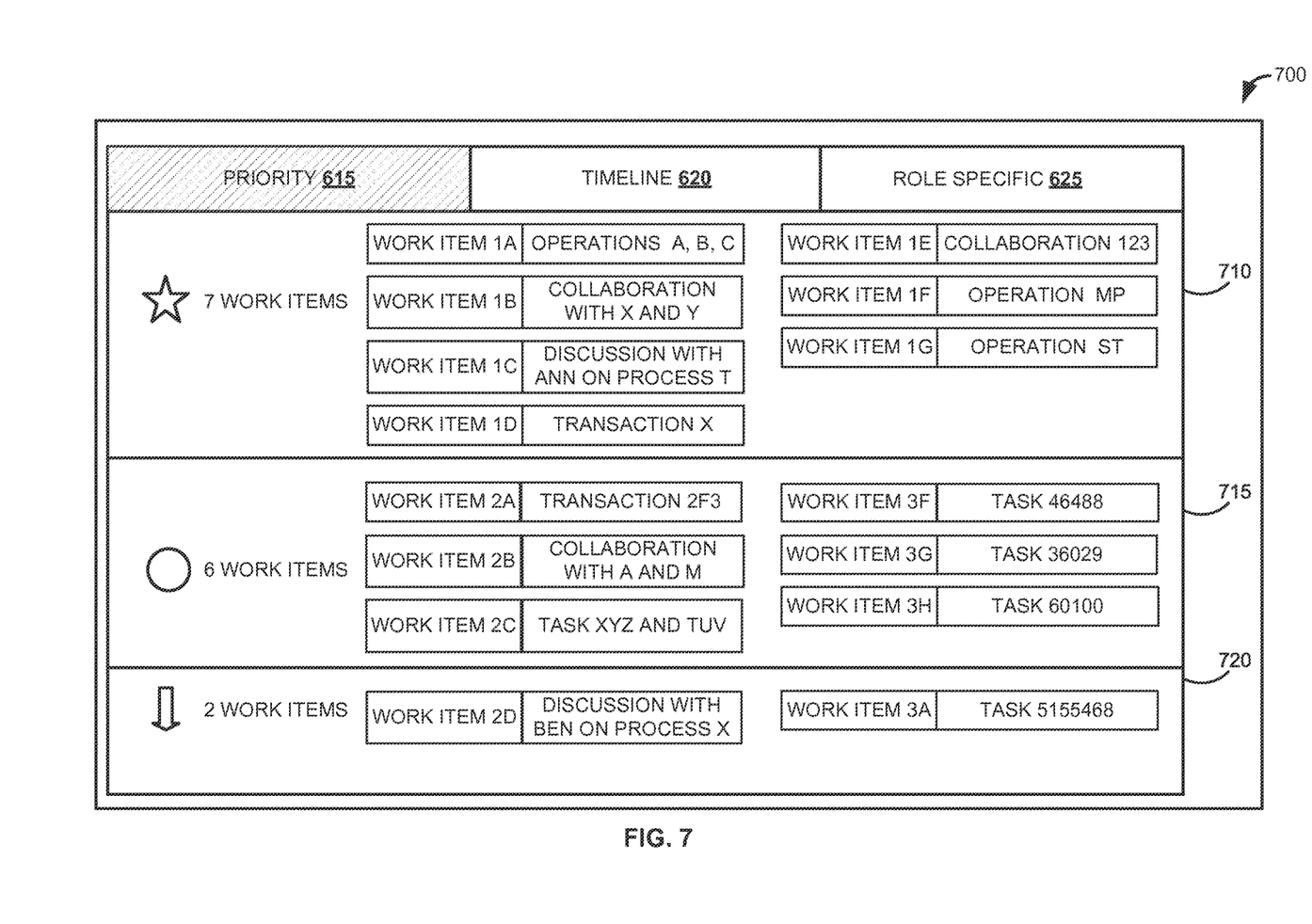
FIG. 7 is a user interface representing an expanded view of customizable swim-lanes that provide a point of entry, according to an embodiment.

FIG. 7 is a user interface representing an expanded view of customizable swim-lanes that provide a single point of entry, according to an embodiment. UI 700 represents an expanded view of the customizable swim-lanes, where parameter PRIORITY 615 is selected (hence, shaded on UI 700). The expanded view of the work-items associated with the selected parameter PRIORITY 615 include seven work-items that are of high priority 710; six work-items of medium priority 715; and two work-items of low priority 720. Element 710 includes an expanded view of UI elements for the seven high priority work items, along with their operational elements. Since UI 700 represents an expanded view, the contents associated with work-items are also rendered. For example, element 710 includes UI elements for seven work items 1A, 1B, 1C, 1D, 1E, 1F and 1G, and their respective functionalities represented by the operational elements OPERATIONS A, B, C; COLLABORATION WITH X AND Y; DISCUSSION WITH AB ON PROCESS T; TRANSACTION X; COLLABORATION 123; OPERATION MP; and OPERATION ST. By activating COLLABORATION WITH X AND Y operational element of work item 1B, collaboration between X and Y may be executed from the landing page. The activation and execution of the functionalities associated with the work-items can thus be performed on the expanded view of the customizable swim-lanes, which provide a single point of entry to the work-items associated with the business process.

In an embodiment, expanded view of the customizable swim-lanes include an orchestration of tasks associated with a user, arranged in a preferred order (e.g. ascending or descending) of occurrence. The user may be able to view the tasks to be performed, execute operations on the tasks, and process the results. The user may also launch the tasks separately, to perform the operations individually in a different UI. Thus, the customizable swim-lanes may be configured to generate a separate point of entry into a subsequent program. The tasks may be categorized depending upon end-dates (e.g. parameter TIMELINE 620) associated with them. Tasks those are due on a current day, a current week, a current month, a current quarter of a current year, or a current year. The tasks may also be categorized depending upon priority of the tasks. The user can configure the priorities of the work-items, or the processor may identify the priorities associated with the work-items and categorize the work-items. Frequented work-items may also be categorized and saved as favorites per a customizable swim-lane. Processes associated with the work-items may also be rendered on the customizable swim-lanes. Discussions with other users, collaborations of processes and work-items, conversations, and relevant topics may be contextually saved, and rendered on discussion swim-lane. These discussion swim-lanes may be accessible in a manner similar to the customizable swim-lanes.

In an embodiment, action views, quick views, and links may be rendered on the customizable swim-lanes, thereby including additional functionalities on the customizable swim-lanes. Action views are configured to execute relevant actions on the associated work-items. For example, consider a work-item of maintaining work-schedule for an employee. Typically, the process involves: going to an appropriate transaction page; searching for an appropriate employee; determining a position/designation of the employee; based upon the designation, determining appropriate assigned work-schedule, and for a rendered work-schedule associated with an employee type, position, and organization, inserting the number of hours worked for a current week. Using the customizable swim-lanes, a single entry into the customizable swim-lanes allows navigation into the application, and insertion of the number of hours worked for a current week. Quick views are configured to render quick or basic information associated with the work-items, which allows a user to understand the functionalities associated with the work items. Links are reference-points to information/content that the user can directly access by clicking or hovering on it. Links on the customizable swim-lanes may point to an entire work-item or a specific element within the work-item.

Some embodiments may include the above-described methods being written as one or more software components. These components, and the functionality associated, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
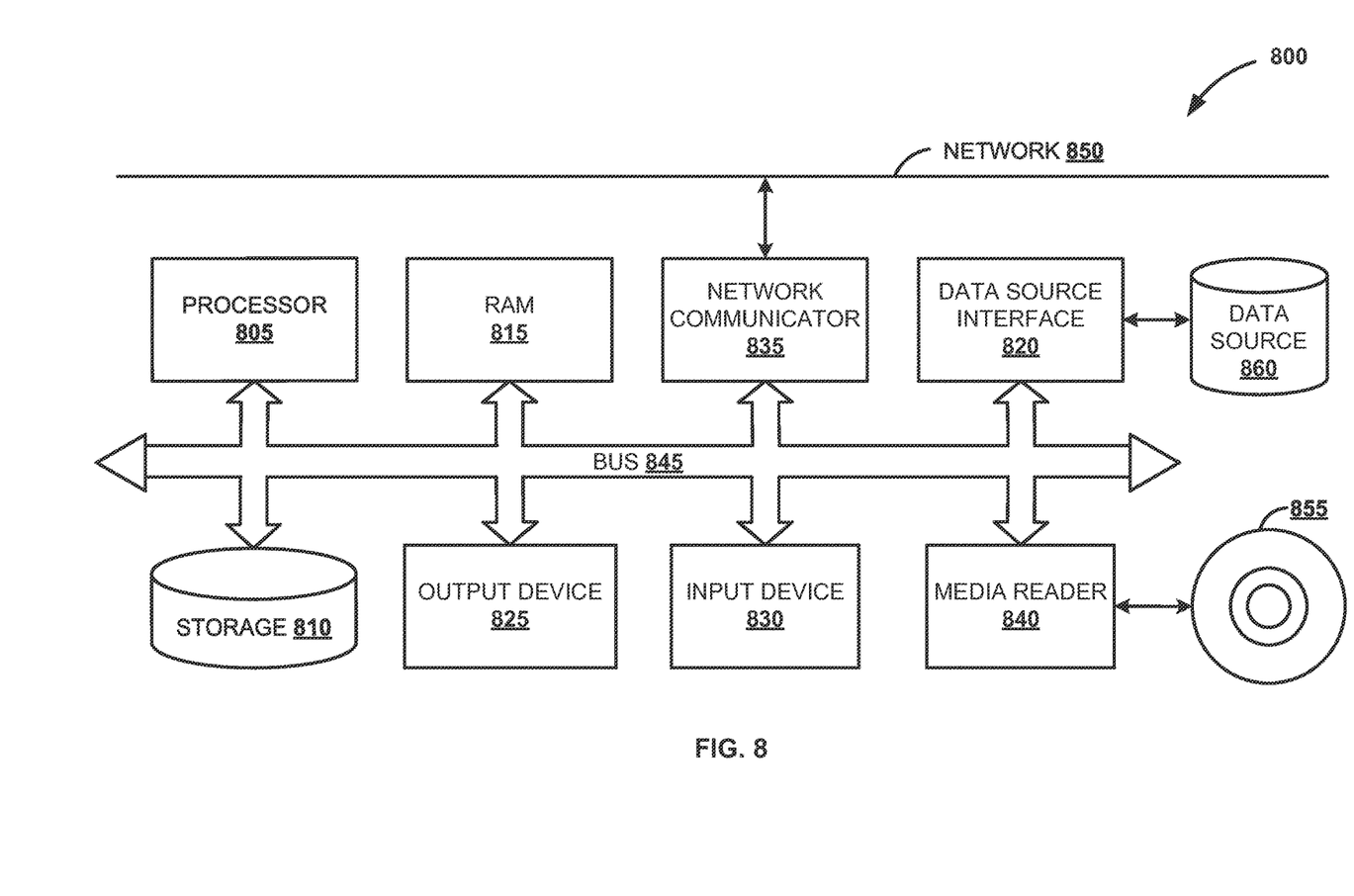
FIG. 8 is a block diagram illustrating an exemplary computer system, according to an embodiment.

FIG. 8 is a block diagram of an exemplary computer system 800, according to an embodiment. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for example. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
   determining a plurality of parameters associated with tasks that are yet to be performed;

identifying a first subset of tasks to be performed, from among the tasks, which each share a common time of performance parameter value, identifying a second subset of tasks to be performed, from among the tasks, which each share at least one of a common priority parameter value and a common rote of an entity value, and generating user interface (UI) elements corresponding to the first and second subset of tasks which are configured to execute functionalities for performing the subset of tasks;

clustering the UI elements configured to execute functionalities of the first subset of tasks into a first clustered view comprising a common access point on the user interface for the first subset of tasks and clustering the UI elements configured to execute functionalities of the second subset of tasks into a second cluster view comprising another common access point on the user interlace for the second subset of tasks;

receiving a selection of a subsets of tasks from among the first subset of tasks which share a time of performance parameter and the second subsets of tasks which share at least one of the common priority parameter and the common role parameter; and rendering a condensed representation of the clustered UI elements of the selected subset of tasks within the respective clustered view via the user interface, in response to receiving the selection.

2. The computer implemented method of claim 1, wherein the rendering comprises rendering a landing page as a single point of entry including the condensed representation of the clustered UI elements of the selected subsets of tasks.

3. The computer implemented method of claim 1, wherein the rendering comprises rendering a swim-lane view including the condensed representations of the UI elements associated with the selected subset of tasks.

4. The computer implemented method of claim 1, further comprising receiving a selection of a parameter from among the determined parameters;
  determining tasks corresponding to the selected parameter to generate an identified subset of tasks;
  classifying the identified subset of tasks corresponding to the selected parameter based upon the associated functionalities; and
  determining actions to be accomplished by the identified subset of tasks to execute the associated functionalities.

5. The computer implemented method of claim 4, further comprising:
  generating a plurality of operational elements that carry out the actions to be accomplished by the identified subset of tasks; and
  consolidating the operational elements to generate the UI elements for executing the functionalities associated with the identified subset of tasks.

6. The computer implemented method of claim 1, wherein the clustering comprises clustering the UI elements of the selected subsets of tasks into a view lane in which the UI elements are inside one or more of a horizontal and a vertical outer boundary of the view lane.

7. The computer implemented method of claim 1, further composing identifying a plurality of tasks associated with a same role of an entity; and
  the clustering further comprises arranging the tasks to be performed by the role of the entity based on when the tasks are to be performed.

8. The computer implemented method of claim 1, wherein the identified subset of tasks comprise a plurality of executable actions which are yet to be taken and which are assigned to a common user via the user interface.

9. The computer implemented method of claim 1, wherein the clustering further comprises arranging the UI elements based on one or more of a timeline of when the identified first subset of tasks are to be performed, a priority of when the identified subset of tasks are to be performed, and a role who needs to perform the identified subset of tasks.

10. An article of manufacture including a non-transitory computer readable storage medium to tangibly store instructions, which when executed by a computer, cause the computer to:
  determine a plurality of parameters associated with tasks that are yet to be performed;
  identify a first subset of tasks to be performed, from among the tasks, which each share a common time of performance parameter value, identify a second subset of tasks to be performed, from among the tasks, which each share at least one of a common priority parameter value and a common role of an entity value, and generate user interface (UI) elements corresponding to the first and second subset of tasks which are configured to execute functionalities for performing the subset of tasks;
  cluster the UI elements configured to execute functionalities of the first subset of tasks into a first clustered view comprising a common access point on the user interface for the first subset of tasks and cluster the UI elements configured to execute functionalities of the second subset of tasks into a second cluster view comprising another common access point on the user interface for the second subset of tasks;
  receive a selection of a subsets of tasks from among the first subset of tasks which share a time of performance parameter and the second subsets of tasks which share at least one of the common priority parameter and the common rote parameter; and
  render a condensed representation of the clustered UI elements of the selected subset of tasks within the respective clustered view via the user interface, in response to receiving the selection.

11. The article of manufacture of claim 10, wherein the instructions further cause the computer to cluster the UI elements of the selected subset of tasks into a view lane in which the UI elements are inside one or more of a horizontal and a vertical outer boundary of the view lane.

12. The article of manufacture of claim 10, the computer further identifies a plurality of tasks associated with a same role of an entity;
  the identifying comprises identifying a plurality of tasks associated with the role; and
  the clustering further comprises arranging the tasks to be performed by the role based on when the tasks are to be performed.

13. The article of manufacture of claim 10, wherein the rendering comprises rendering a landing page as a single point of entry including the condensed representation of the clustered UI elements of the selected subset of tasks.

14. The article of manufacture of claim 13, wherein the rendering comprises rendering a swim-lane view including the condensed representations of the UI elements associated with the selected subset of tasks.

15. A computer system comprising:
  a processor configured to read and execute instructions stored in one or more memory elements; and
  the one or more memory elements storing instructions related to-configuring a user interface (UI) engine to:

determine a plurality of parameters associated with tasks that are yet to be performed;

identify a first subset of tasks to be performed, from among the tasks, which each share a common time of performance parameter value, identity a second subset of make to be performed, from among the tasks, which each share at least one of a common priority parameter value and a common role of an entity value, and generate user interface (UI) elements corresponding to the first and second subset of tasks which are configured to execute functionalities for performing the subset of tasks;

cluster the UI elements configured to execute functionalities of the first subset of tasks into a first clustered view comprising a common access point on the user interface for the first select of tasks and cluster UI elements configured to execute functionalities of the second subset of tasks into a second duster view comprising another common access point on the user inter lace for the second subset of tasks;

receive a selection of a subsets of tasks from among the first subset of tasks which share a tune of performance parameter and tire second subsets of tasks which share at least one of the con a non priority parameter and the con a non rote parameter; and render a condensed representation of the clustered UI elements of the selected subset of tasks within the respective clustered view via the user interface, in response to receiving the selection.

16. The computer system of claim 15, wherein the UI engine is further configured to identify a plurality of tasks associated with a same role of an entity; and arrange the tasks to be performed by the role based on when the tasks are to be performed.

17. The computer system of claim 15, wherein the UI engine is configured to render a landing page as a single point of entry including the UI elements of the selected subset of tasks.

18. The computer system of claim 17, wherein the rendering comprises rendering a swim-lane view including a condensed representation of the UI elements associated with the selected subset of tasks.

* * * * *